United States Patent
Judson et al.

(10) Patent No.: US 11,625,779 B2
(45) Date of Patent: *Apr. 11, 2023

(54) ELECTRONIC OUTCRY MESSAGING FOR ELECTRONIC TRADING

(71) Applicant: Chicago Mercantile Exchange Inc., Chicago, IL (US)

(72) Inventors: Daniel Judson, Cambridge, MA (US); Prashant Kumar, Jersey City, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/314,407

(22) Filed: May 7, 2021

(65) Prior Publication Data

US 2021/0264518 A1    Aug. 26, 2021

Related U.S. Application Data

(63) Continuation of application No. 14/454,499, filed on Aug. 7, 2014, now Pat. No. 11,030,688.

(51) Int. Cl.
*G06Q 40/04*    (2012.01)
(52) U.S. Cl.
CPC .................... *G06Q 40/04* (2013.01)
(58) Field of Classification Search
CPC ..................................................... G06Q 40/04
USPC ........................................................ 705/3–44
See application file for complete search history.

(56) References Cited

U.S. PATENT DOCUMENTS

| | | | |
|---|---|---|---|
| 6,499,053 B1 | 12/2002 | Marquette et al. | |
| 6,768,981 B2 * | 7/2004 | Patterson, Jr. | .......... H04L 61/50 705/37 |
| 7,389,294 B2 | 6/2008 | Kotas et al. | |
| 7,472,977 B2 | 1/2009 | Fujimoto et al. | |
| 7,614,547 B2 | 11/2009 | Kotas et al. | |
| 7,908,198 B1 * | 3/2011 | Keith | ..................... G06Q 40/00 705/37 |
| 8,249,975 B1 * | 8/2012 | Keith | ..................... G06Q 40/04 705/37 |
| 8,359,246 B2 | 1/2013 | Buchheit | |
| 8,756,149 B2 | 6/2014 | Auerbach | |
| 8,862,507 B2 | 10/2014 | Sandhu et al. | |
| 9,659,296 B2 | 5/2017 | Patel | |
| 2002/0032641 A1 | 3/2002 | Mendiola et al. | |

(Continued)

OTHER PUBLICATIONS

"A revolution in securities markets' structures ? " Financial Market Trends 65: 15-37, Organisation for Economic Cooperation and Development, Proquest ID: 224605213, Nov. 1996.*

(Continued)

*Primary Examiner* — Frantzy Poinvil
(74) *Attorney, Agent, or Firm* — Lempia Summerfield Katz LLC

(57) ABSTRACT

Methods, devices, and systems for facilitation of communication between participants of an electronic marketplace involve receiving a message generated from a market participant and transmitting the message to other market participants. The facilitation also involves receiving responses to the message from the other market participants and transmitting the responses to the message originating market participant such that the transmitted response is imperceptible to the other market participants.

22 Claims, 6 Drawing Sheets

(56) References Cited

U.S. PATENT DOCUMENTS

| | | | |
|---|---|---|---|
| 2004/0059666 A1* | 3/2004 | Waelbroeck | G06Q 40/04 |
| | | | 705/37 |
| 2004/0139001 A1 | 7/2004 | Henriques et al. | |
| 2005/0171836 A1 | 8/2005 | Leacy | |
| 2005/0192888 A1* | 9/2005 | Lennane | G06Q 20/023 |
| | | | 705/37 |
| 2008/0103987 A1 | 5/2008 | Bocheck | |
| 2011/0320364 A1 | 12/2011 | Van Horn et al. | |
| 2012/0197969 A1 | 8/2012 | Poon | |
| 2012/0317051 A1 | 12/2012 | Tall, IV | |
| 2013/0297439 A1 | 11/2013 | Chanoine | |
| 2013/0325982 A1 | 12/2013 | Krantz et al. | |
| 2014/0279336 A1 | 9/2014 | Eid et al. | |
| 2014/0279358 A1* | 9/2014 | Rosenberg | G06Q 40/04 |
| | | | 705/37 |
| 2014/0316926 A1 | 10/2014 | Gounares et al. | |
| 2016/0042454 A1 | 2/2016 | Judson et al. | |
| 2019/0295156 A1* | 9/2019 | Waelbroeck | G06Q 40/06 |

OTHER PUBLICATIONS

Cserna et al. "Counterparty Risk in Exchange-Traded Notes (ETNs)", The Journal of Fixed Income, New York vol. 23, Iss. 1, 76-101.4, Summer . (Year: 2013).*

GFI Investor Day New York, Final, Publication info: Fair Disclosure Wire, Linthicum, ProQuest document Id: 466900931, May 10, 2007.

* cited by examiner

ELECTRONIC OUTCRY MESSAGING FOR ELECTRONIC TRADING

CROSS-REFERENCE TO RELATED APPLICATIONS

This application is a continuation under 37 C.F.R. 1.53(b) of U.S. application Ser. No. 14/454,499, filed Aug. 7, 2014, now U.S. Pat. No. 11,030,688, the entirety of which is incorporated herein by reference in its entirety and relied upon.

BACKGROUND

A financial instrument trading system, such as a futures exchange, referred to herein also as an "Exchange", such as the Chicago Mercantile Exchange Inc. ("CME"), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces are an alternative to pit or open outcry based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic exchanges, while efficient and immediate, do not necessarily provide or include the immediate and available communication between traders provided by traditional, pit or open outcry based trading environments. For example, electronic exchanges generally do not match the price improvement capabilities of an open outcry exchange where floor brokers and market makers can handle large and complex orders through in-person or face-to-face communication. Communication delays can prevent market makers and others from changing their quotes or orders fast enough to reflect market conditions, thus forcing many market participants to use ancillary methods of communication, such as telephones, outside the electronic market environment to communicate. This communication external to the trading system is both inefficient and difficult to regulate.

Accordingly, there is a need for an exchange system and method that can provide real-time interactive communication capabilities for electronic exchanges.

DETAILED DESCRIPTION

Figure 1:
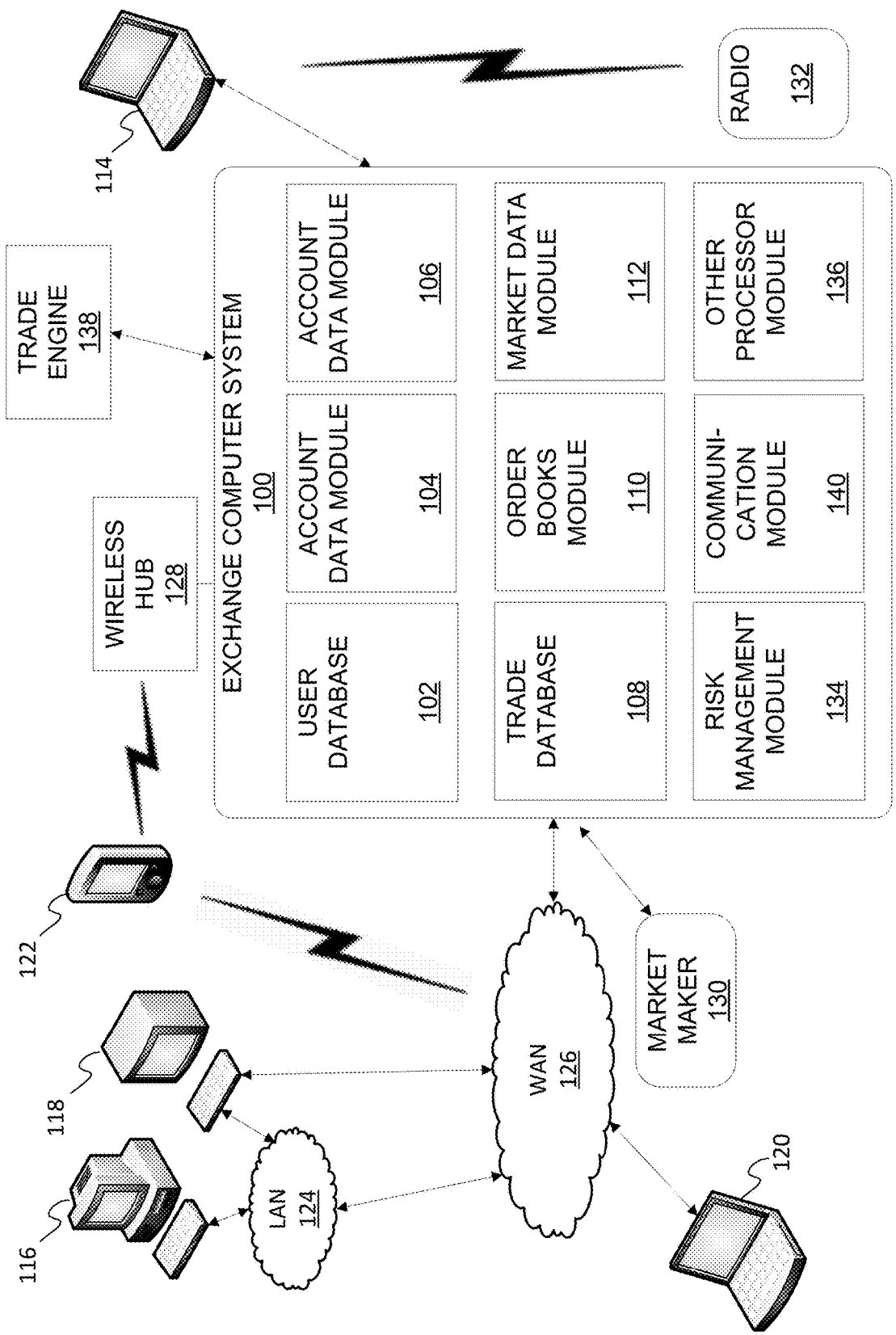
FIG. 1 depicts a system for facilitating communication between market participants.

The disclosed embodiments relate to communicative messaging capabilities that allow trading parties, such as market makers, traders and other market participants, to communicate within an electronic trading system and which may allow for more efficient communication before, during and after trade execution, as well as an ability for the electronic trading system to manage, regulate, log or otherwise track market related communications for regulatory or other purposes. Further, the disclosed embodiments provide an environment in which market makers may initiate and engage in communication with other market participants via the act of submitting/placing an order/offer within a market, and subsequently participating in a communication environment initiated thereby. The communication environment may be limited to only participants of that market such that the market maker may communicate and/or negotiate with other participants, also trading in that market, to respond to inquiries, counter offers, and/or other communications of the market participants. The communication environment may facilitate interactive communication in real-time regarding markets associated therewith and/or other topics. For example, communications between parties may be conveyed as instantaneously as possible so as to allow substantially contemporaneous communication regarding changes in the markets as those changes are realized by a trading system. Further, market information (i.e. price, trading volume, etc.) may be provided in an integrated manner within the communication environment. In this way, an interactive communication experience may facilitate the interaction of multiple market participants within a single environment to facilitate the generation and execution of tradable combinations. The market participants may control the generation and matching of even the most complex offers in an efficient manner that reflects real time market conditions. Further, the electronic trading system may be coupled with the communication environment such that messages generated within the communication environment may be actionable by a market participant within the communication environment to execute actual trading activity.

The following embodiments may facilitate communication between market participants and/or parties to a trade. For example, a trader may post a message to a forum in which other traders in a particular financial market are participants. The other traders may then respond to the message in the forum such that access to these responses is limited to the message posting trader, i.e. a participating trader is able to see the original message but is unable to see responses thereto posted by other participating traders. In this way, negotiations and other communication related to market activity may be facilitated while minimizing message traffic among the participating traders which may, for example, reduce noise and bandwidth consumption. Also, linking such a forum with an electronic trading system may also allow an electronic trading system to track communications among market participants related to trading activity in markets of the electronic trading system.

The following embodiments may relate to electronic message packets communicated using any wired and/or wireless communications network, including the internet. The Internet, in particular, is a worldwide network which primarily uses the Transport Control Protocol and Internet Protocol ("TCP/IP") to permit the exchange of information including electronic message packets. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet ("NNTP" or Network News Transfer Protocol) for the collaborative sharing and distribution of information. It will be appreciated that the disclosed embodiments may relate to messages communicated using the TCP protocol, however the disclosed embodiments are applicable to messages communicated using many different transport protocols both now and later developed. For example, the enclosed embodiments may relate to the use of User Datagram Protocol ("UDP") techniques to communicate messages. Further, chat rooms, or other consolidated communication forums may be generated and/or provided for users based on transmitted and/or received electronic messages. Any chat services, clients, and/or protocols may be used to generate a forum. For example, Adium, Kopete, or other clients and/or protocols may be used.

In an embodiment, trade related messaging capabilities may be integrated with an over the counter ("OTC") electronic market facilitating system. OTC markets may facilitate the trading of securities and/or other derivatives using a dealer network as opposed to a centralized exchange. In such an environment, multiple dealers or market makers may be generating markets for the trading of products such as simple securities and derivatives, or more complex trading products such as interest rates swaps, credit default swaps, commodities contracts, commodity index swaps, or any other product. The data relating to trading products, as well as the trading activity based thereon, may be provided in trading grids as a reference to market makers and other market participants to provide information relating to active and/or current markets. The trading grids may involve a specific organization of available or resting orders for the trading products. A trading grid may involve a graphical user interface of products and/or orders such as may be used with respect to pricing ladders involving market depth displays, top of book displays, or any other type of organization of market data. The graphical user interface may be displayed using a computer display or monitor, such as is described with respect to FIG. 4. In these markets, market participants may negotiate or otherwise communicate directly with a market participant acting as a market maker with regard to the product being offered. As such, communicative messaging capabilities may be particularly useful in OTC systems as traditionally there is significant communication between multiple parties to complete a transaction. In an embodiment, trading grids for products of a specific market may be displayed proximate to communication of messaging components that provide a communication environment for the markets.

Specific messaging functionality in a communications environment may further facilitate trade matching. In an embodiment, an electronic trading system, such as a system implemented using the computer of FIG. 4, may be configured to display, using the display 414, multiple trading grids relating to markets generated for various products. For example, an OTC trading grid may be provided for LN Henry Hub European options on natural gas ("NG"). Market makers and other market participants, collectively traders, may focus on a particular product, and monitor a trading grid for this product throughout an active trading period. A communications environment, such as a dedicated communication forum, chat room, or other communication room involving a consolidated communication environment, may be provided for the traders of a particular type of product. A chat room, communication environment, forum, or room may be considered any form of synchronous or asynchronous conferencing system or environment. A room may facilitate one-to-many communication techniques as well as limitations on the display, distribution, or other transmission of messages provided to the room by participants in communication events or sessions using the room. A room may be implemented using a system, such as the computer 400 of FIG. 4, to control a distribution of messages to members or participants in a room. For example, a room may be configured to allow a one to many messaging, but limit access or transmission of responses to particular participants. As such, a room, or forum, may involve a hybrid combination of one-to-many, one-to-one, or even many-to-some communication modes.

The room may allow message generation from any participant in the room such that any trader currently accessing the room may view or otherwise consume the message. Alternatively, or in addition thereto, the room may be configured such that only the message generating trader may view messages generated in response to the original message. In this way, a trader may announce, or outcry, an offer to buy or sell a product to all traders currently accessing the room, but maintain secrecy and control of information provided in response to the offer during the negotiation process. For example, a market making trader may generate a message indicating an offer to sell one thousand (1000) units of NG at $4.504 per unit. Multiple traders currently accessing the room may respond with counter offers or other communications. For example, a trader may counter with a message asking if the market making trader would be willing to sell five hundred (500) units of NG at 4.510 per unit. Other traders may also provide counteroffers or inquiry messages. In this way, communication relating to trade discussion beyond a mere acceptance of an offer or a specific trade match based on counteroffers within a defined executable similarity may be facilitated. In an embodiment, only the market making trader may be able to view the messages generated in response to the original offer. The market making trader may then communicate directly with particular traders accessing the room to finalize and execute a trade.

Another messaging functionality may involve limiting a trader's ability to view or access messages provided by participants in a room to only those messages that were generated during a time when the trader was actively in the room. For example, a trader may have access to only those messages generated after the trader joined or otherwise initiated a participation in the room, and an activity level of the trader in the room indicates that the trader is consuming messages of the room. Also, sessions of actively accessing a room by a trader may be intermittent or otherwise interrupted by non-active time periods. For example, a trader may leave a room by actively selecting an option to no longer access a room, i.e. sign out, or a trader may have a period of inactivity in the room or system providing the room such that a trader is considered dormant or inactive. A trader may also be considered to leave a room if the trader is dormant. For example, a system may detect that the trader has not performed any interactions with the system for a set period of time, and as such the trader would be considered dormant. For example, a graphical user interface may not be active on a trader's computer display for a period of time, or a trader may have left the computer for a period of time. As such, a computer system used by the trader may provide presence information indicating a presence state for the trader. The presence state may indicate that a trader is considered active or dormant in the room. In another example, a system may actively send messages, or ping, a trader to determine if the trader is active. Further, if a trader leaves the room and returns at a later time, the trader would not be able to view messages generated in the room during the trader's absence.

The communications environment of the room may be monitored such that it would be known which traders had access to what messages during a trading period. For example, it could be determined if a particular trader had specific access to information that was provided in a room. The trader could be logged-out, dormant, or otherwise not accessing messages of a room and this lack of access could be noted. Further, participant messaging activity may be correlated with participant presence data. For example, participant presence data may indicating a particular participant's presence state and this state may be associated with messages. Further, messages may be associated with data indicative of participants that had a presence state indicated as active when the message was transmitted or otherwise provided. A log of this and other activity may be created, archived, and provided to officials or regulatory agencies if requested. The log may involve any interval for reporting. For example, a log may involve activity for a current day and may be stored in an archive with similar logs of other days.

Another messaging functionality may involve integrating communicative messaging with an electronic trading system such that contact methods and information for traders creating bids or offers that are currently pending, or resting on an offer book. The communication environment may be provided access to this information, and a message may be generated by a trader within the communication environment by selecting the offer in the electronic trading system. The communication environment may itself be generated as a window or box within or external to a user interface of the electronic trading system. Further, the message may be generated in the communication environment as coupled with the electronic trading system and sent to external systems such as an external email or messaging system if the contact information for the creating trader indicates these contact methods.

Another messaging functionality may involve group or blast messaging. For example, a trader currently participating or active in a particular market may select or identify a group of recipients for a message relating to the status of the market. Such a message for example may be automatically generated based on market information from the electronic trading system, such as a current best-bid-offer ("BBO") for a product in the market. In an embodiment, the message may be sent to non-participants in the market. For example, a trader in the market acting as a broker for a multiple individual investors may choose to generate such a message and have it sent to a list of individual investors whose contact information is stored as a group of non-participants in the market. Further a trader may select a group of contacts to whom the message is to be sent from multiple groups of contacts. In this way, a broker or trader may provide current market information to non-participants in an efficient manner to solicit interest in the market. Such blast messaging may also apply to market participants.

In an embodiment, a private network communication forum or room may be generated or initiated by a participant in an electronic marketplace. The participant may be able to specify other participants that have access to the room by reference to a contact list, and link the room to a particular electronic market. The room may be operational allow a room participant to send a message to all other room participants. Further, the room may be operational to allow only the message sender may view any responses provided to the message.

For example, a broker may create a room with all of the broker's customers who trade in a particular product, such as near-term LN options ("LN"). The broker may initiate the generation of a trading grid with information relating to a LN market such as price and/or offers for sale or purchase of LN products. The broker may be particularly interested in options executable within a four month window. The broker may generate a message within or in relation to the trading grid that may be sent to a contact list of the broker's customers. The message may appear in a window associated with the trading grid as accessed by the broker and customers individually. Such a window presented in a user interface for the broker may further display all the responses to the message generated by the customers, whereas a similar window presented to the customers in a user interface may only display the original message and responses generated by the particular customer to which the window is being displayed.

In another example, a trader may generate a room for all of the trader's customers or other market participants who deal in a particular kind of product, such as long-dated LN options. The trader may create, within a graphical user interface, a trading grid, specific to the long-dated LN options, such that the trading grid includes communicative messaging capability using a chat room. The trader may enter a message into the chat room requesting quotes for products associated with products of the trading grid. The trader may then receive responses to the message that include quotes for products generated by other members of the chat room. Further, the trader may be the only member of the chat room that is able to see the responses in the chat room. Contrarily, a chat room member generating a particular response may also be able to view the particular response.

Also, a trading grid may display markets for specific products with each market often having a centralized limit order book containing multiple bids and/or offers. Each bid and offer may be generated or backed by a market participant that has recorded contact information with an electronic exchange that facilitates market activity and the generation of the trading grids. The trading grid may then be coupled with communication functionality such that a market participant may select a bid or offer within a graphical user interface of the trading grid and a communication session may be generated with the market participant that generated the offer or bid. This communication session may be a one-to-one communication session using instant messaging functionality provided in association with the trading grid. A graphical window for the communication session may appear as a part of the trading grid graphical user interface, or separate from the trading grid graphical user interface. For example, a broker may view a trading grid displaying a market for May 2014 LN options. The broker may click on the best bid available in the trading grid, or alternatively enter a designated keyboard shortcut, and a one-to-one chat window may be generated in the graphical user interface connecting the broker with a bid backer, i.e., a market maker. The broker may then communicate directly with the bid backer. The original bid may have involved 20 contracts, but the broker may inquire using the one-to-one chat window whether the bid backer is willing or able to trade 50 contracts instead of the displayed 20 contracts. The bid backer may also provide an affirmative response using the chat window. Further, the bid backer's response may be actionable within an electronic market such that the broker may be able to execute the 50 contract trade by triggering an action mechanism contained in the message. For example, the response message may include a button that indicates a 50 contract trade will be executed upon selection of the button by the broker.

Further, communication capability may be provided such that a market participant may communicate with not only active market participants such as market participants currently associated or participating in a particular chat room, but also a wider or different communication audience. For example, a particular trading grid may be selected and a message containing market information of the trading grid may be generated and transmitted to any recipient, such as a list of recipients having various communication modes of contact. The modes of contact may include e-mail, short message service ("SMS"), or any other mode of contact or communication. In an embodiment, a best-bid-offer ("BBO") of the market, as displayed in the trading grid, is included in such a message. For example, a broker may select a particular product in a trading grid. In response to the selection, a message may be generated that includes the BBO of the market for the selected product at that time. The message may then be transmitted to a list of contacts having various contact modes. Further, the generated message may be editable prior to transmission. For example, the message may initially read "LN Dec14 5.25 Straddle 2.20/2.35 10×10", and the broker may edit the message to read "LN Dec14 5.25 Straddle 2.20/2.35 paper offer".

In accordance with aspects of the disclosure, systems and methods are disclosed for electronic outcry messaging for electronic trading. The disclosed embodiments are preferably implemented with computer devices and computer networks, such as those described with respect to FIG. 4, that allow users, e.g. market participants, to exchange information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading and/or communication systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100. Also, the exchange computer system 100 may include a communication module 140 that may facilitate messaging or other communication between the market maker 130 and/or the computer devices 114, 116, 118, 120 and 122 via wide area network 126 and/or local area network 124.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names, passwords, a preferred contact method, and contact information for the preferred contact method. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A communication module 140 may be included to, among other things, facilitate communication between traders and/or market makers as well as external contacts of traders and/or market makers. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

In an embodiment, the communication module 140 may include a chat room or other consolidated communication forum membership management component configured to receive requests from market participants to join or leave the consolidated communication forum. The membership management component may also be configured to establish the communication forum based on the received request to join, and manage a membership of the communication forum base on the received requests to join or leave the communication forum.

The communication module 140 may also include a message relay or management component that is configured to receive a message generated by a market participant member of the communication forum, transmit the message to other market participant members of the communication forum, and receive at least one response to the message, the at least one response generated by a particular participant of the other market participant members. The message relay or management component may also be configured to transmit the at least one response to the market maker such that the transmitted response is imperceptible to the other market participants aside from the particular participant.

The trading and communication network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the Exchange computer system 100 further includes a message management module 140 which may implement, in conjunction with the market data module 112, the disclosed mechanisms for managing market messages containing financial data sent between an exchange and/or a plurality of market participants. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
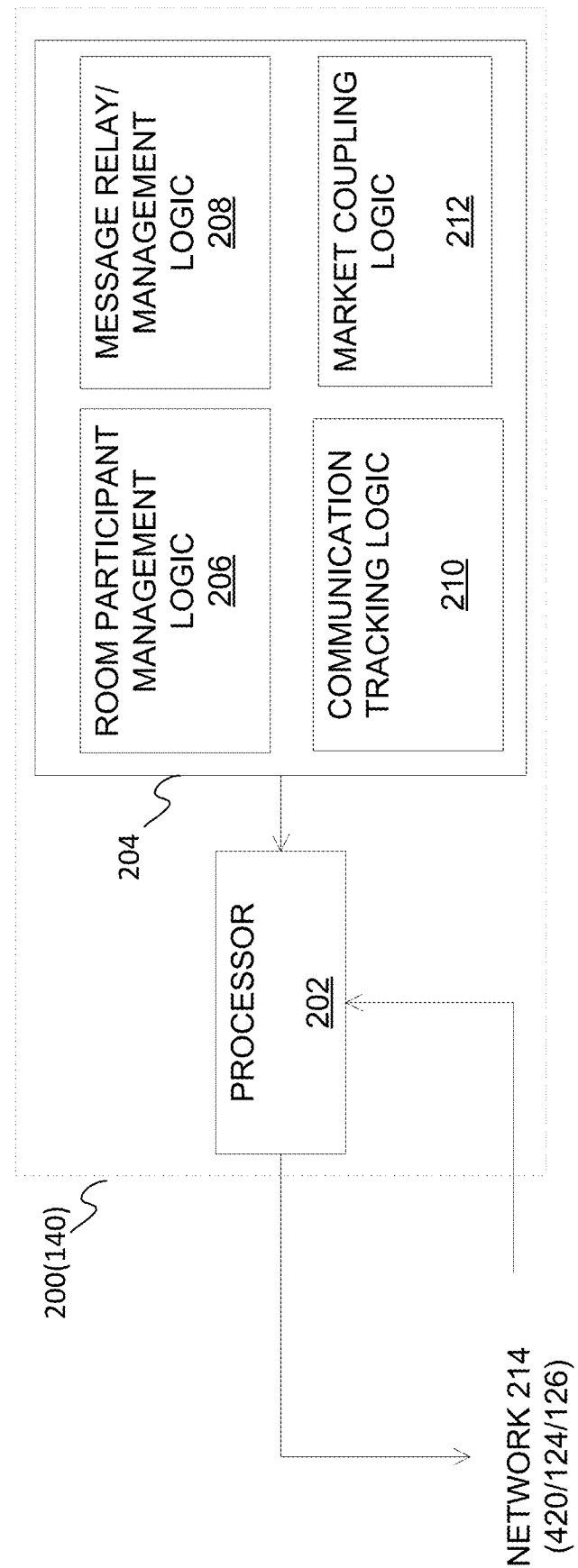
FIG. 2 depicts an embodiment of the communication module of the system depicted in FIG. 1.

FIG. 2 depicts a block diagram of a communication module 140 according to one embodiment, which in an exemplary implementation, is implemented as part of the exchange computer system 100 described above.

The embodiments described herein utilize trade related messages such as mass quote messages, individual order messages, cancellation messages, as well as communicative messaging between parties or entities to trade activity. The trading entity may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

FIG. 2 also shows a system 200 for management of communication of market and communicative messages to a plurality of market participants via a network 214 which, as described above, may be the network 420 described below or network 124 or 126 described above, which may be implemented as a communication module 140 as described above. The system 200 may involve functionality to facilitate the organization and management of communicative messages exchanged between trading parties or participants of a market. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. Nos. 7,831,491, 8,745,147, and U.S. Patent Publication No. 2005/0096999 A1, all of which are incorporated by reference herein in their entirety. Further, the disclosed market and communicative message management system may be implemented using an open message standard implementation, such as FIX or FIX/FAST, by an Exchange-provided API, or any combination thereof.

The system 200 includes a processor 202 and a memory 204 coupled therewith which may be implemented as processor 402 and memory 404 as described below with respect to FIG. 4. The system 200 further includes a chat room or other consolidated communication forum membership management logic 206 stored in the memory 204 and executable by the processor 202 to receive requests from market participants to join or leave the consolidated communication forum. The requests to join or leave the consolidated communication forum may be considered requests to no longer receive copies of messages submitted to the forum. The membership management logic 206 may also be executable by the processor 202 to establish the communication forum based on the received request to join, and manage a membership of the communication forum base on the received requests to join or leave the communication forum.

The communication module 140 may also include a message relay or management logic 208 that is stored in the memory 204 and executable by the processor 202 to receive a message generated by a market participant member of the communication forum, transmit the message to other market participant members of the communication forum, and receive at least one response to the message, the at least one response generated by a particular participant of the other market participant members. The message relay or management logic 208 may also be configured to transmit the at least one response to the market maker such that the transmitted response is imperceptible to the subset of market participants other than the particular participant that received the message. The message relay and/or management logic 208 may be further configured to function in correlation with the room participant and/or management logic 206 to provide that messages and responses transmitted during a time between a market participant's leaving and re-entry to a forum or room are withheld from the market participant even after re-entry to the forum and/or room of the market participant.

In an embodiment, the communication module 140 may also include market coupling logic 212 stored in the memory 204 and executable by the processor 202 to couple the communication module 140 with electronic markets. The market coupling logic 212 may be configured to trigger the message management logic 208 to generate a message that relates to an offer to buy or sell a product in an electronic market. Further, the market coupling logic 212 may be configured to provide data relating to the electronic market to the message management logic 208 such that the message may contain data relating to the electronic market. Also, the market coupling logic 212 may provide data relating to an electronic market to the room management logic 206 such that particular an electronic forum or room may be specifically coupled to a particular electronic market for a product. For example, the message may contain data descriptive of the offer to buy or sell the product such as text indicating a price associated with the product or a best-bid-offer price of the product. Also, the market coupling logic 212 may be configured to cause the message or content of the message to be actionable on the electronic exchange. For example, a portion of text of a message may be formatted so as to be selectable by a trader or market participant that receives the message. The selection of the text may trigger an action in the electronic marketplace. For example, a message may recite "accept" and by selecting the "accept" text, a market participant accepts an offer to buy or sell associated with the message. Further, the actionable text may be included with other text which is descriptive of the trade or serves other communication purposes, but is not actionable.

In an embodiment, the communication module may also include communication tracking logic 210 stored in the memory 204 and executable by the processor 202 to track the messaging activity of the message relay and/or management logic 208. The communication tracking logic 210 may be configured to associate messages and responses with particular market participants that had access to the messages or responses. For example, market participants that were sent transmissions of the messages or responses would be associated with the messages or responses. Further, the communication tracking logic may also be configured to generate a log or other output providing the associations between messages and market participants.

Figure 3:
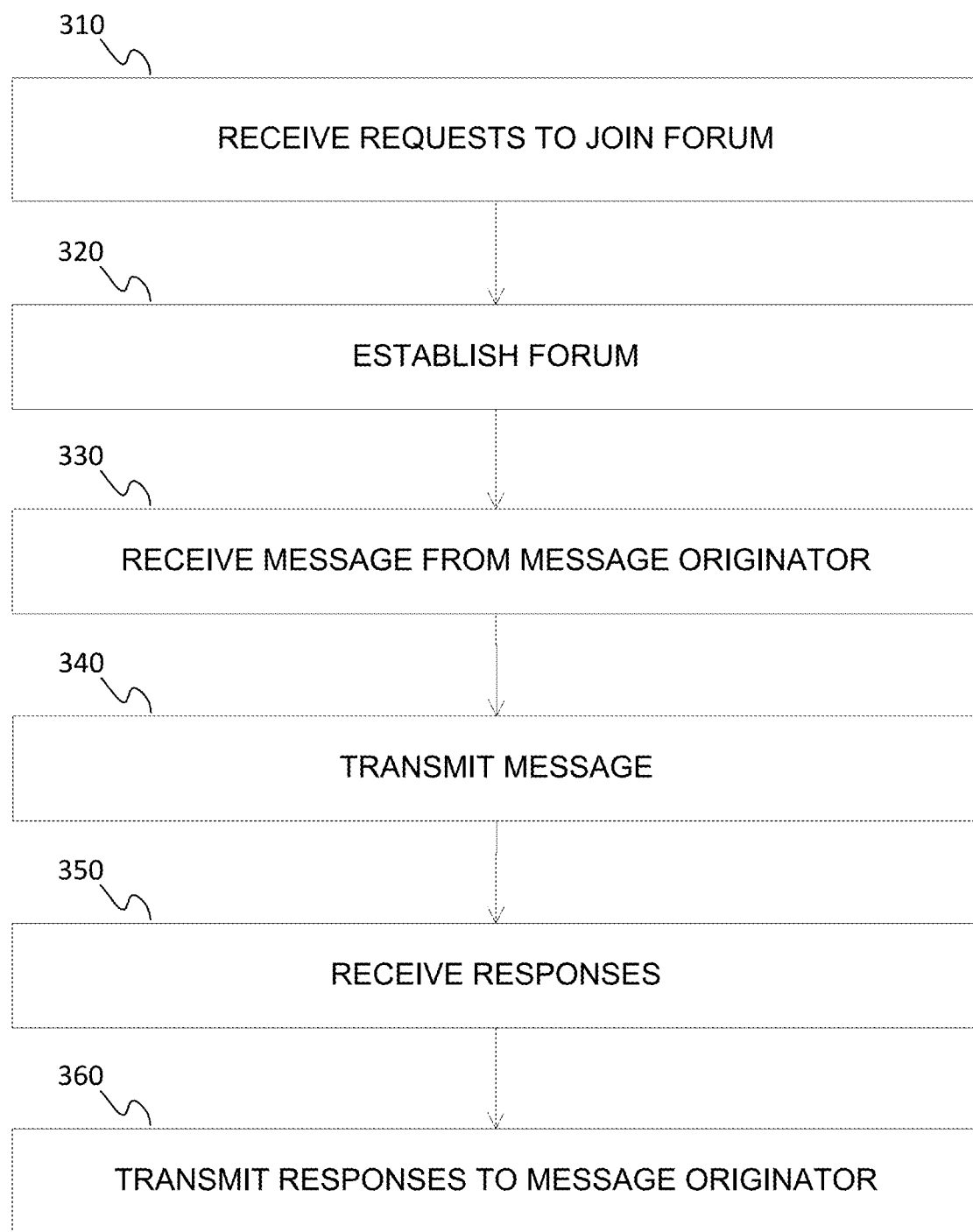
FIG. 3 depicts a block diagram of embodiments for facilitating communication between market participants.

FIG. 3 depicts a flow chart showing operation of the system 200 of FIG. 2. In particular FIG. 3 shows a computer implemented method for managing communication between a plurality of market participants via a network 214. The operation includes receiving requests from a subset of a set of the plurality of market participants to join a consolidated communication forum (Block 310), establishing the consolidated communication forum with the subset of the plurality of market participants (Block 320), receiving a message generated by a market participant of the subset of market participants (Block 330), transmitting the message to other market participants of the subset of the plurality of market participants (Block 340), receiving at least one response to the message, the at least one response generated by a particular participant of the other market participants (Block 350), and transmitting the at least one response to the market participant such that the transmitted response is imperceptible to the subset of market participants other than the particular participant (Block 360). Additional, different, or fewer indicated acts may be provided. The indicated acts may be performed in the order shown or other orders. The indicated acts may also be repeated. Further, it may be noted that a subset of the set of the plurality of market participants may include a number of the set of market participants up to and including all of the set of market participants.

An embodiment involves receiving (Block 310) a requests to join a forum. The forum may be a chat room or other consolidated communication forum involving one-to-many communication functionality. The requests may be received from any individual or system. For example, the requests may be provided by traders or market participants of an electronic market. The market participants may be a subset of a number of market participants participating in electronic markets. Further, the requests may be generated using any system. For example, the requests may be generated by embodiments involving the general computer system 400 of FIG. 4, and transmitted using the network 420. The requests may be processed and/or graded according to criteria or requirements for admission to the forum. For example, admission to the forum may require that a requestor is a market participant in a particular electronic market for a particular product. In an embodiment, the forum may be associated with an electronic market established for a product such as a financial product or derivative thereof. A request to join the forum may be generated, transmitted, and/or received in response to selection of a representation of the market in a user interface. For example, a user such as a trader or market participant may select a button, or designated screen area, within a user interface displaying data related to the market. The selection of the button may trigger a generation, transmission, and/or receipt of a request to join a forum based on the market. In an embodiment, a forum may involve a collection of members that receive copies of messages submitted by other members of the forum. Further, the request may involve any data indicative of an individual accepting an invitation, or indicating a desire, to join the forum.

A forum may be established (Block 320). The forum may be established with any membership. For example, the forum may be established with a subset of market participants associated with the requests received to join the forum (Block 310). As such, the membership of the forum may be considered to be the subset of market participants. The forum may be established using any services, clients, and/or protocols. For example, Adium, Kopete, or other clients and/or protocols may be used. In an embodiment, a forum may be a basic collection of electronic contact information for members. In an embodiment, a forum may involve a communal presentation of messages and/or other communications provided by members. Further, the forum may contain rules and/or other restrictions on the ability of members to communicate within the forum. For example, some messages in the forum may be viewable by all members of the forum, whereas other messages in the forum may be viewable only by particular members of the forum.

Further, requests to leave a forum may also be received. Establishing a forum (Block 320) may involve managing a membership of a forum based on received requests to join and/or leave the forum. Also, membership of the forum may be tracked over time and a log may be generated that indicates the membership of the forum at different times. In an embodiment, a participant in the forum may only have access to messages, or other communications, that were provided to the forum during the time the participant was a member of the forum. For example, a member may join the forum for a first period of time, leave the forum for a second period of time, and re-join the forum for a third period of time. The member may then have access to messages received or transmitted from the forum during the first and third period of time, but the messages received or transmitted during the second period of time are withheld from the member such that the messages are invisible or otherwise imperceptible to the member.

As indicated above, the forum may involve a set of operational rules or characteristics. The characteristics may be configurable by an initiator or administrator of the forum. Characteristics may involve any characteristic related to the operation or establishment of the forum. For example, a forum may be established with a singular forum administrator which solely has access to control forum configurations. A forum may also be established with multiple forum administrators. Also, a forum may control access to the forum. For example, only the forum administrator may invite or allow membership in the forum. Further, a forum may involve restrictions on IP addresses or domains of forum members. For example, a forum may be established that only allows members sharing a same IP address or domain. In another example, members having an IP address or domain from a list of specific IP addresses or domains may be allowed as members in the forum. In addition, characteristics may limit participation in a forum based on operational roles of forum members. For example, roles may be associated with members, and members having identified conflicting roles may be excluded from the forum. For example, a banker will have a conflicting role to a research analyst. In another example, a forum may allow or exclude members having specific roles. Also, characteristics may involve the ability to copy text of the forum and the ability to paste text into the forum. In an embodiment, the ability to copy and paste text in a forum may be eliminated or otherwise restricted. Also, a forum may be restricted such that a forum is not persistent. For example, a forum may be allowed to serve a communication purpose only during active trading periods of associated markets. Also, a forum may become a read only forum if an administrator is not currently active in the forum. In an embodiment, a market participant may cause a forum to be generated with the market participant as the administrator of the forum. The forum may have characteristics such that the administrator can view all messages in the forum, but the other members of the forum may only view particular message, such as messages from the administrator. For example, any responses to a message from an administrator may not be seen by other members of the forum. Also, existence of forum members in the forum besides the administrator may be hidden from other forum members.

Further, administrative super status may be provided on a system level such that a super administrator may be able to access all current and previously generated forums. This access may not be apparent to forum members. For example, a super administrator will not be listed in a list of forum members provided to forum members during an active forum. Further, a super administrator may not have the entry or exit of a room noted for member participants. However, super administrator access may be noted in logs of forum membership or participation. Further, the super administrator may be notified of all forum requests or forum generation events. Such a notification may involve a time, date, forum name, forum generators name or other identification, identification of forum invitees, as well as source IP and/or network name of the forum generator.

A message may be received (Block 330) from a message originator. The message may be originated or generated by a member of a forum. For example, the message may be generated by a market participant of a subset of market participants for which a forum has been established. The message may be received by a communication module 140 of an exchange computer system 100 as is described with respect to FIG. 1.

The message may be an unsolicited message. For example, the message may be a request, a statement or otherwise a message having no association with another message. In such an instance, an association may be by subject to or created when a user specifically replies to a message. For example, a response received (Block 350) that are responsive to the message may be associated with that message. The association may be explicit and involve specific code or text forming the association between the message and the response. For example, a message may include a specific combination of characters that will be copied into any replies to the message. Also, a message may have an implied association with another message based on a similarity of text or other data of the message.

The message may relate to an offer to buy or sell a product in an electronic marketplace. For example, the message may contain data descriptive of the offer to buy or sell the product. Further, the message may involve text indicating a price, such as a best-bid-offer ("BBO") price for the product. Also, the message may be generated in response to a selection of the offer. For example, a user interface may present a representation of the offer, and a market participant, such as a member of the forum, may select the representation of the offer, thus triggering the generation of the message relating to the offer. As indicated above, such generated message may involve data relating to the offer that was selected. The message may then be transmitted such that the message is received by a system in which the forum is established.

In an embodiment, the message may be actionable in an electronic marketplace. For example, the message may contain a link or other trigger configured to execute a set of commands when selected. The commands may involve executing a trade or other market activity. For example, the commands may involve accepting an offer upon which the message was based or associated.

The received message may be transmitted (Block 340) to recipients. In an embodiment, the message may be transmitted to members of the forum. For example, the message may be transmitted to other market participants of the subset of market participants. The other market participants may be all the members of the forum, or any number of the members of the forum such as a selected group of forum members.

In an embodiment, the message may be generated by a message originator in an attempt to solicit interest in a product or offer in an electronic marketplace. For example, a market participant may generate and submit a message to a forum referencing an offer indicating that they wish to sell a product at a certain price. The message may be received by the forum, and transmitted to the other members of the forum by various methods including posting to a communal message board or chat room of the forum.

Further, in an embodiment the message may be transmitted to other recipients that are not members of the forum. For example, the message may be transmitted to a group not included in the subset of market participants. This group may involve a collection of recipients specified by the originator of the message. Transmitting to recipients in this way may involve using the same protocols or standards established for the forum, or different protocols or standards. For example, the message may be transmitted to non-forum members using an e-mail protocol. In an embodiment, a message may be generated by a market participant based on an order to buy or sell a product in the electronic marketplace. That message may be transmitted to a group of non-forum member recipients, or a combination of forum members and non-forum member recipients. Such group or blast communication may involve an attempt by the message originator to solicit interest in a product, market, and/or forum.

Responses to the message may be received (Block 350). The responses may be formatted as messages like the original message. The responses may be generated by recipients of the transmitted message (Block 340). For example, the responses may involve counter offers, or offers to negotiate with the message originator. In an embodiment, the responses may be actionable, similar to the original message as described above. For example, a counteroffer may be provided in the response, and a trade may be executed in an electronic marketplace by the selection of part of the text in the message.

The responses may be transmitted (Block 360) to the message originator. The responses may be transmitted to the message originator in a manner providing that the transmitted response is imperceptible to other recipients of the original message, besides a particular originator of a response. The response may be transmitted only to the message originator such that the message originator is the singular participant able to read or otherwise consume the message. For example, while the original message may be posted in a communal message board for the forum (Block 340) including permissions or rules allowing for all forum members to access, responses may be posted to the same message board, but having different permissions or rules such that only the message originator and the response originator may view the response. Other methods of transmission may also be provided. For example, responses may be transmitted to the message originator using interactive dialog boxes such that a particular one-to-one communication session is established with the response originator. Similarly, in an embodiment, responses to an unsolicited message may only be provided to the generator of an unsolicited message to which the response is a responsive message.

Also, messages and responses may be associated with recipients such that those having access to the content of messages may be recorded. For example, the message referenced above may be associated with the other market participants that received the message, as well as the message originator. In an embodiment, these associations may allow for a log to be generated for the messages and/or responses provided in or related to the forum. The log may indicate who had access to what information relating to a financial market associated with the forum at what time.

Figure 5:
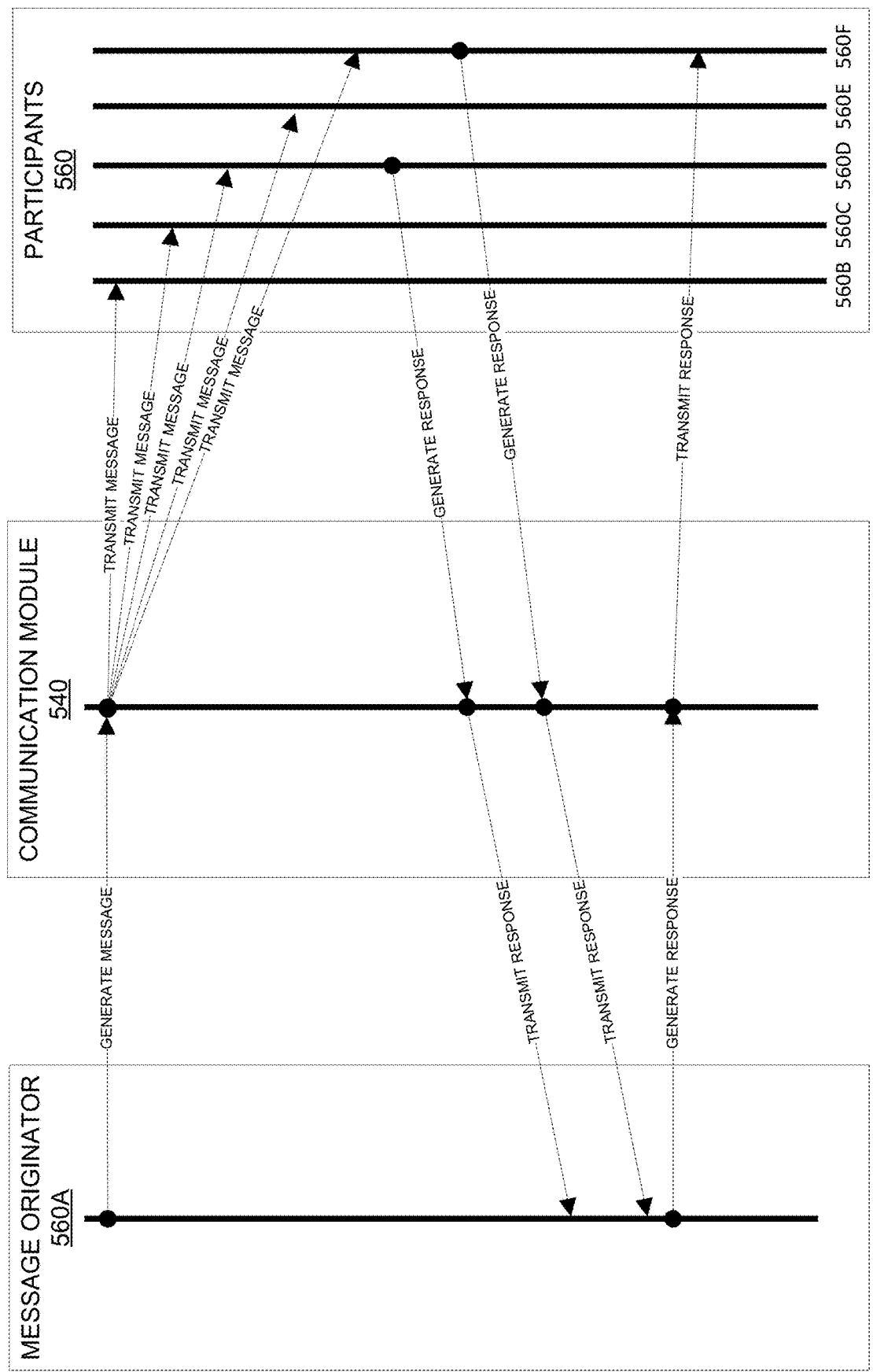
FIG. 5 illustrates a generation and transmission of messages and responses between participants in a communication session for electronic outcry messaging.

FIG. 5 illustrates the generation and transmission of messages and responses between participants in a communication session for electronic outcry messaging. The electronic outcry messaging may involve a communication module 540, which may involve the communication module 140 as shown in FIG. 1. In an embodiment, the communication module 540 may involve a general messaging system or communication forum not coupled to an electronic market. The communication module 540 may involve a list of participants that will receive copies of messages transmitted or otherwise provided to the communication module 540. The communication module may involve a group of participants of a communication session which may include a message originator 560A as well as other participants 560.

In an embodiment, a message originator 560A may generate a message. The message may be generated using the communication module 540, or remotely by the message originator 560A and provided to the communication module 540 through a transmission or other techniques. The communication forum 540 may then transmit copies of the message to particular participants 560B-F, of the other participants 560. The particular participants 560B-F may all receive the message and read or otherwise consume the message. Several of the particular participants 560D, 560F may choose to provide a message responsive to the original message, i.e. a response. The particular participants 560D, 560F may generate individual responsive messages and submit the responsive messages to the communication module 540. Upon receiving the responsive message the communication module 540 may be configured to transmit the responsive message to the original message originator 560A. In an embodiment, the message originator 560A may be the only participant of the communication session that will receive a copy of the received responsive messages. Further, the message originator 560A may read or otherwise consume the responsive messages, then choose to provide an additional response to one of the particular participants 560F. As such, the message originator 560A may generate a response to the responsive message, and provide the responsive message to the communication module 540. The communication module 540 may then transmit the response to the particular participant 560F. In an embodiment, the particular participant 560F may be the only other participant 560 that receives the response from the message originator 560A.

In an embodiment, the communication module 540 may facilitate the distribution of messages and responses through the establishment of a forum or chat room that transmits messages based on a set of rules configured to control access to communication between the message originator 560A and the other participants 560 in the communication session, or forum. For example, the message originator may initiate the creation of a forum using the communication module 540. The message originator 560A may then cause the communication module to transmit or distribute invitations to join the forum to particular participants 561, 560D, 563, 564, 560F that the message originator 560A selects. The invitations may be considered invitations to participate in the exchange of messages and message responses between the message originator 560A, as well as other participants 560. The particular participants 560B-F, may return accepted requests to the communication module 540. Upon receipt of the accepted requests, the communication module 540 may establish the forum with a forum membership including the message originator 560A and the other participants 560 that have accepted the invitation to join the forum.

Further, the set of rules configured to control access to communication between the forum members may be designated or selected by the message originator 560A from collection of potential rules for the forum. For example, as indicated above, the message originator 560A may establish a rule set that allows a message originator 560A to send a message to all of the other participants 560, but any responses to the message will only be provided to the message originator 560A.

Figure 6:
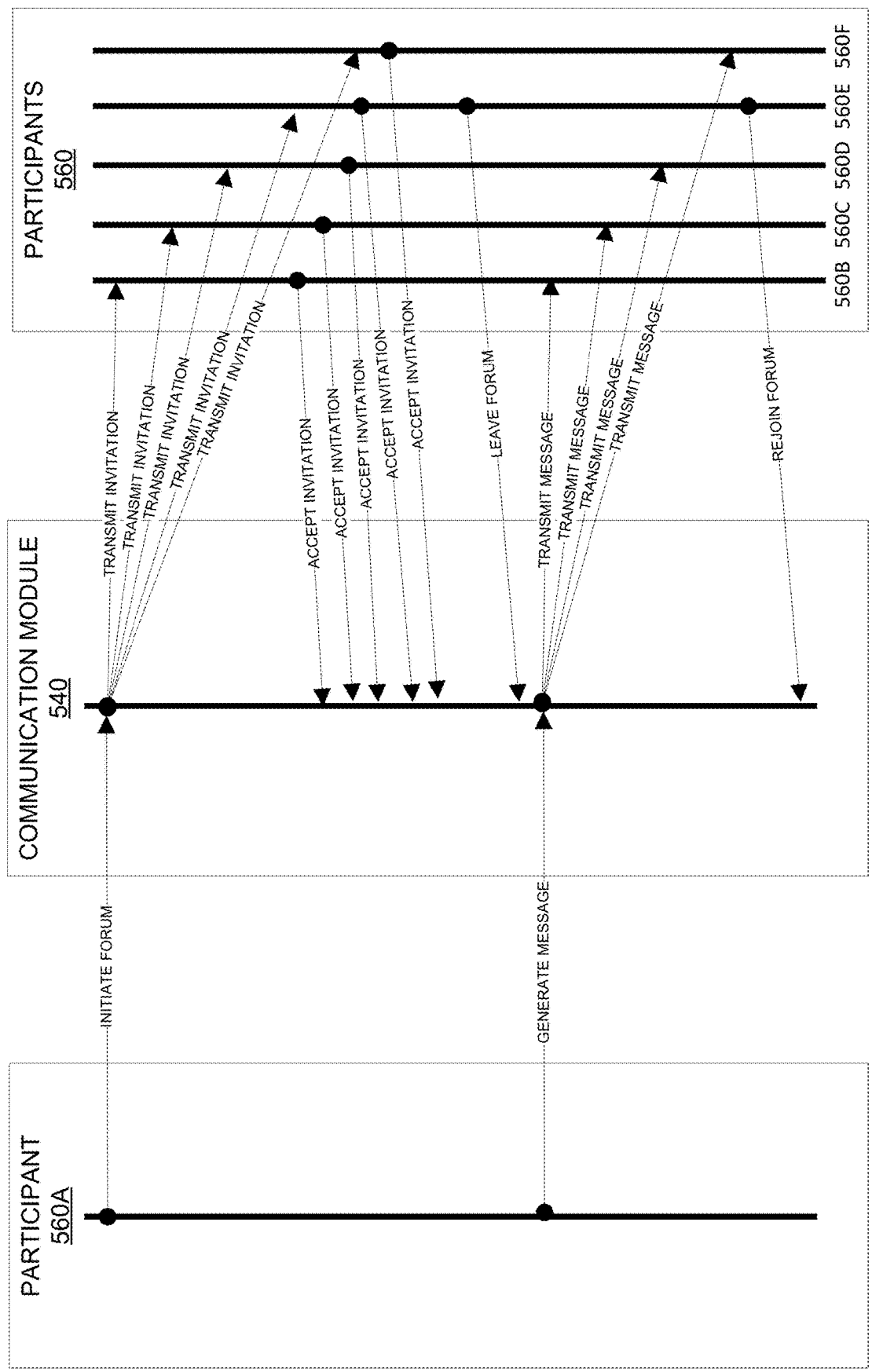
FIG. 6 illustrates a receipt of messages by current forum members provided in electronic outcry messaging.

Other administrative rules may also be in place as established by the communication module 540, or an administrator of the communication module 540. For example, as illustrated in FIG. 6, a member 560E may have access to only the messages and responses provided while the member is currently and/or actively accessing a forum. Any messages and/or responses sent when the member 560E is not currently and/or actively accessing a forum will not be viewable by the member, but may be viewable to other members that were accessing the forum during the other member's absence. For example, the communication module 540 may not transmit the message to the member before or after the member 560E rejoins the forum.

Also, the communication module 540 may have rules configured to allow a log of all members that were provided transmissions and/or other access to the messages and/or responses of the forum. For example, a log would indicate that the message originator 560A and the other participants 560 had access to the information of the original message. However, a log would indicate that a particular participant 560D and the message originator 560A had access to a response to the original message. Such a log may operate for a specific time period, or as long as the forum is active.

The communication module 540 may also involve a set of rules to control and/or track membership in a forum as illustrated in FIG. 6. In an embodiment, a participant 560A may initiate a forum using the communication module 540. Initiating a forum may involve any activity operational to trigger the communication module 540 to establish a set of communication rules for members of a forum, and generate and transmit invitations for participants 560B-F to become members of the forum. To become members, the participants 560B-F may accept the invitation transmitted by the communication module, or perform some other act such that the communication module 540 receives data indicating that the participants 560B-F would like to join the forum. Subsequently, one of the participants 560E may leave the forum. Leaving the forum may involve an active submission or act by the participant 560E indicating that the participant 560E does not want to receive messages from the forum, or alternatively, a lack of activity may indicate that the participant 560E has gone dormant in the forum, and as such has left the forum. The communication module 540 may be further configured to subsequently allow the participant 560E to rejoin the forum. The rejoining may be an active request from the participant, or may be an indication of activity of the participant that indicates that the participant 560E is no longer dormant. Further, participants 560 may have access to messages generated in the forum only if the participants were participating or active at the time the messages are generated. In an embodiment, a participant may join, leave, and re-join a forum. As such, the participant may view, or have transmitted, messages generated in the forum during a time period from joining to leaving, and from re-joining until any subsequent leaving of the forum, but not during the time period from leaving to rejoining.

In an alternate embodiment, participants 560 may not need to be invited to join a forum. For example, participants 560 may provide a request to join the forum to the communication module 540 to join the forum wherein the request was not solicited by another participant 560A.

Figure 4:
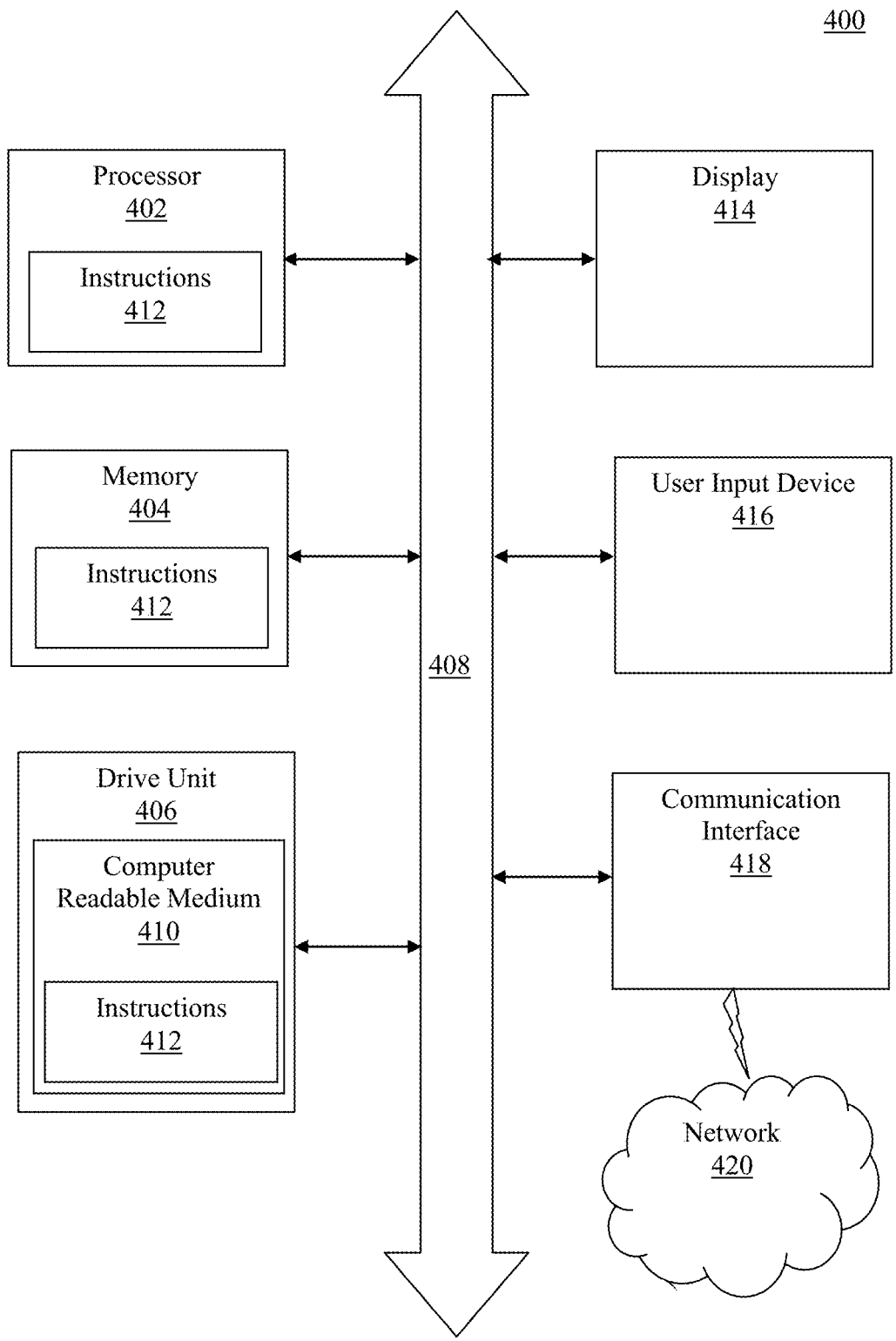
FIG. 4 shows an illustrative embodiment of a general computer system for facilitating communication between market participants.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement embodiments for facilitation of deterministic management of electronic message packets.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly. In an embodiment, the communication interface 418 may be configured to communicate electronic message packets through the network 420 to a common destination.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a reconfigurable logic device or an ASIC (application specific integrated circuit). As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"— somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory. In an embodiment, the deterministic message processor 220 shown in FIG. 2A may be implemented using an FPGA or an ASIC. For example, the packet order determining 256 and/or the packet processing 258 may be implemented as an FPGA. In an embodiment, both the packet order determining 256 and the packet processing 258 may be implemented using the same FPGA.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
    receiving, by a specifically configured processor via an electronic communications system coupled therewith, an electronic message generated by a market participant of a subset of a plurality of market participants enabled to generate and receive electronic messages via the electronic communication system;
    determining, by the processor, whether the received electronic message is solicited or unsolicited, wherein the electronic message is determined to be solicited when it is responsive to another electronic message previously communicated to the market participant, and otherwise determined to be unsolicited;
    transmitting, automatically by the processor via the electronic communications system based on the determination that the received electronic message is unsolicited, the received electronic message to all other market participants of the subset of the plurality of market participants; and
    transmitting, automatically by the processor via the electronic communications system based on the determination that the received electronic message is solicited, the received electronic message only to the market participant of the subset of the plurality of market participants who generated the other electronic message to which the received electronic message is responsive, the received electronic message not being transmitted via the electronic communications system to the others of the subset of the plurality of market participants.

2. The computer implemented method of claim 1, wherein the unsolicited received electronic message relates to an offer to buy or sell a product in an electronic marketplace communicated to the subset of the plurality of market participants, the solicited received electronic message comprising a response to the offer to buy or sell from one of the plurality of market participants.

3. The computer implemented method of claim 2, wherein the electronic message was generated in response to a selection of the offer to buy or sell the product via a user interface of the electronic marketplace presented to the market participant, the electronic message comprising data descriptive of the offer to buy or sell the product including a price associated with the product at a time of generation of the electronic message.

4. The computer implemented method of claim 2, wherein the electronic message includes actionable data that when activated is configured to execute an action in the electronic marketplace.

5. The computer implemented method of claim 4, wherein the actionable data is configured to cause an acceptance of the offer to buy or sell the product in the electronic marketplace.

6. The computer implemented method of claim 1, wherein the solicited electronic message includes actionable data that when activated is configured to cause execution of an action in the electronic marketplace.

7. The computer implemented method of claim 1, further comprising:
    receiving, by the processor, an electronic request from each of the subset of the plurality of market participants to be enabled by the electronic communications system to generate and receive electronic messages via the electronic communication system.

8. The computer implemented method of claim 7, wherein the requests comprise a request to join a consolidated communication forum, and the consolidated communication forum is coupled with a particular market for a product in an electronic marketplace.

9. The computer implemented method of claim 1, further comprising:
    storing, by the processor in a memory coupled therewith, data indicative of the market participants to which the electronic message was communicated and when the electronic message was communicated thereto.

10. The computer implemented method of claim 1, further comprising:
preventing, by the processor, any of the subset of the plurality of market participants determined to not be receiving communications of electronic messages via the electronic communications system for a period of time from subsequently accessing any electronic messages communicated via the electronic communications system during that period of time.

11. A system comprising:
a processor; and
computer executable instructions stored in a memory coupled with the processor that when executed by the processor, cause the processor to:
receive, via an electronic communications system coupled with the processor, an electronic message generated by a market participant of a subset of a plurality of market participants enabled to generate and receive electronic messages via the electronic communication system;
determine whether the received electronic message is solicited or unsolicited, wherein the electronic message is determined to be solicited when it is responsive to another electronic message previously communicated to the market participant, and otherwise determined to be unsolicited;
transmit, automatically via the electronic communications system based on the determination that the received electronic message is unsolicited, the received electronic message to all other market participants of the subset of the plurality of market participants; and
transmit, automatically via the electronic communications system based on the determination that the received electronic message is solicited, the received electronic message only to the market participant of the subset of the plurality of market participants who generated the other electronic message to which the received electronic message is responsive, the received electronic message not being transmitted via the electronic communications system to the others of the subset of the plurality of market participants.

12. The system of claim 11, wherein the unsolicited received electronic message relates to an offer to buy or sell a product in an electronic marketplace communicated to the subset of the plurality of market participants, the solicited received electronic message comprising a response to the offer to buy or sell from one of the plurality of market participants.

13. The system of claim 11, wherein the solicited electronic message includes actionable data that when activated is configured to cause execution of an action in the electronic marketplace.

14. The system of claim 11, wherein the computer executable instructions are further executable by the processor to cause the processor to receive an electronic request from each of the subset of the plurality of market participants to be enabled by the electronic communications system to generate and receive electronic messages via the electronic communication system.

15. The system of claim 11, wherein the computer executable instructions are further executable by the processor to cause the processor to store, in the memory, data indicative of the market participants to which the electronic message was communicated and when the electronic message was communicated thereto.

16. The system of claim 11, wherein the computer executable instructions are further executable by the processor to cause the processor to prevent any of the subset of the plurality of market participants determined to not be receiving communications of electronic messages via the electronic communications system for a period of time from subsequently accessing any electronic messages communicated via the electronic communications system during that period of time.

17. A system comprising:
a first logic stored in a memory and configured to be executed by a processor to cause the system to receive, via an electronic communications system coupled with the processor, an electronic message generated by a market participant of a subset of a plurality of market participants enabled to generate and receive electronic messages via the electronic communication system;
a second logic stored in the memory and configured to be executed by the processor to cause the system to determine whether the received electronic message is solicited or unsolicited, wherein the electronic message is determined to be solicited when it is responsive to another electronic message previously communicated to the market participant, and otherwise determined to be unsolicited;
a third logic stored in the memory and configured to be executed by the processor to cause the system to transmit, automatically via the electronic communications system based on the determination that the received electronic message is unsolicited, the received electronic message to all other market participants of the subset of the plurality of market participants; and
a fourth logic stored in the memory and configured to be executed by the processor to cause the system to transmit, automatically via the electronic communications system based on the determination that the received electronic message is solicited, the received electronic message only to the market participant of the subset of the plurality of market participants who generated the other electronic message to which the received electronic message is responsive, the received electronic message not being transmitted via the electronic communications system to the others of the subset of the plurality of market participants.

18. The system of claim 17, wherein the unsolicited received electronic message relates to an offer to buy or sell a product in an electronic marketplace communicated to the subset of the plurality of market participants, the solicited received electronic message comprising a response to the offer to buy or sell from one of the plurality of market participants.

19. The system of claim 17, wherein the solicited electronic message includes actionable data that when activated is configured to cause execution of an action in the electronic marketplace.

20. The system of claim 17, further comprising:
a fifth logic stored in the memory and configured to be executed by the processor to cause the system to receive an electronic request from each of the subset of the plurality of market participants to be enabled by the electronic communications system to generate and receive electronic messages via the electronic communication system.

21. The system of claim 17, further comprising:
a fifth logic stored in the memory and configured to be executed by the processor to cause the system to store, in the memory, data indicative of the market participants to which the electronic message was communicated and when the electronic message was communicated thereto.

22. The system of claim 17, further comprising:
a fifth logic stored in the memory and configured to be executed by the processor to cause the system to prevent any of the subset of the plurality of market participants determined to not be receiving communications of electronic messages via the electronic communications system for a period of time from subsequently accessing any electronic messages communicated via the electronic communications system during that period of time.

\* \* \* \* \*